United States Patent Office 3,434,497
Patented Mar. 25, 1969

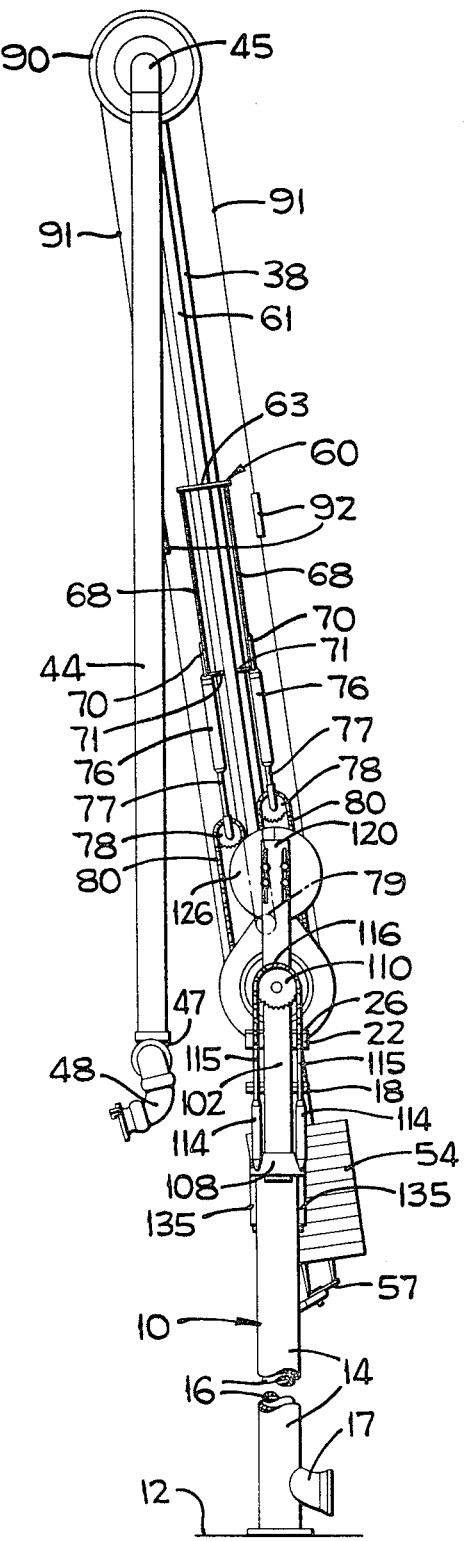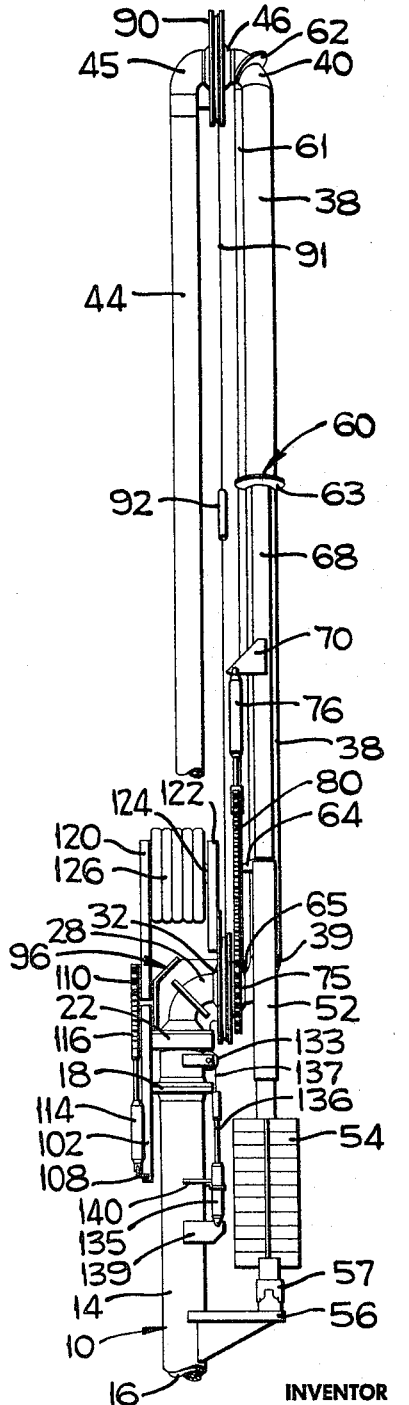

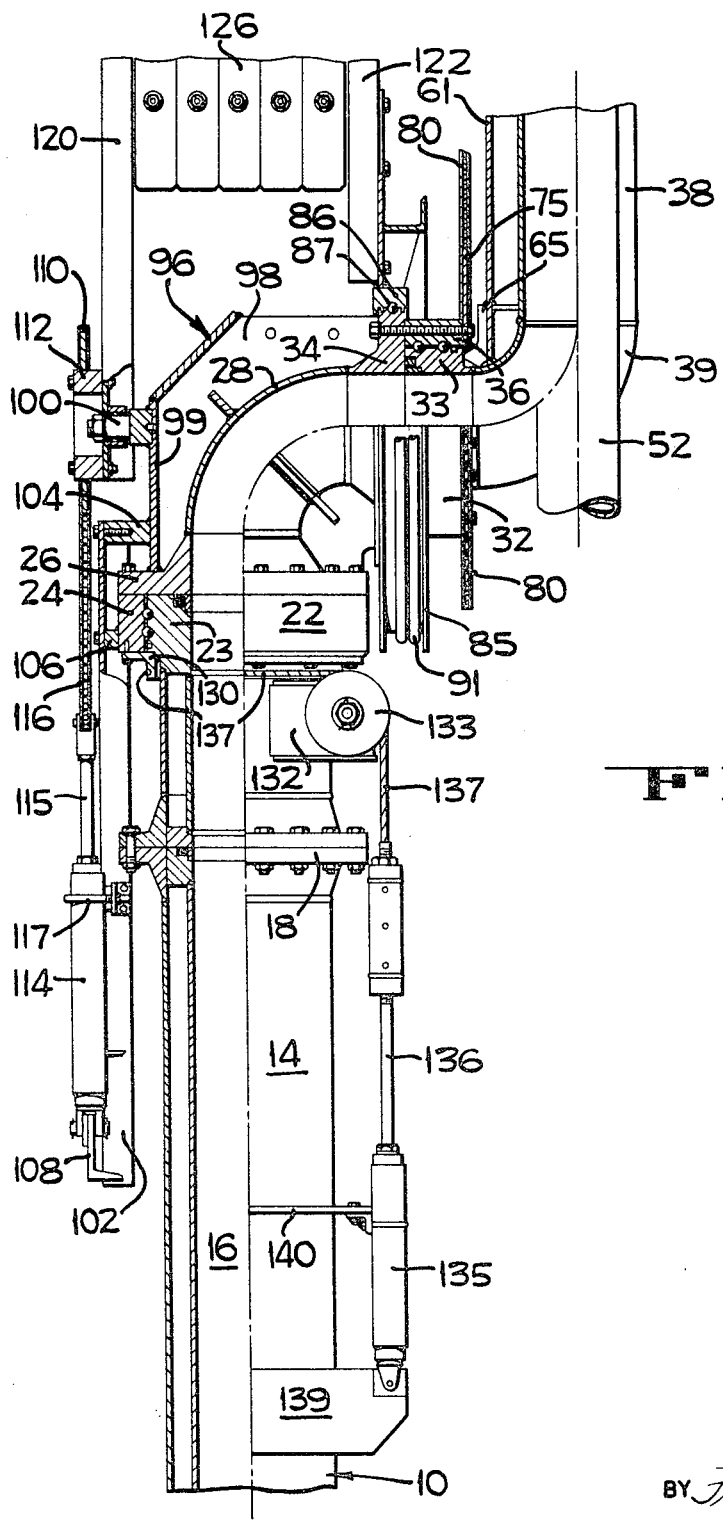
FIG_3

3,434,497
FLUID TRANSFERRING APPARATUS
Peter J. Bily, Sunset Beach, Calif., assignor to FMC Corporation, San Jose, Calif., a corporation of Delaware
Filed Feb. 14, 1966, Ser. No. 526,994
Int. Cl. B67c *5/36, 5/60, 5/64*
U.S. Cl. 137—615                                    8 Claims

ABSTRACT OF THE DISCLOSURE

A fluid transferring apparatus of the marine loading arm type, including an upstanding support, an inner arm conduit mounted on the support for elevational movement about an inner axis, an outer arm conduit pivotally connected to the inner arm for elevational movement about an outer axis, a first mechanism for counterbalancing both inner and outer arms about the inner axis, a second mechanism for counterbalancing the outer arm about the outer axis, and a third mechanism for rotating or slewing the entire apparatus about an upstanding axis through the support.

---

The present invention pertains to a fluid transferring apparatus and more particularly to an apparatus in which powered mechanism is provided for moving the apparatus in various directions.

A fluid transferring apparatus with which the subject invention is especially useful is a double-counterweighted marine loading apparatus. This loading apparatus includes a riser; an inner pipe mounted on the riser for elevational movement about an inner axis; an outer pipe pivotally connected to the inner pipe for elevational movement about an outer axis substantially parallel to the inner axis; a coupling swivelly mounted on the outer end of the outer pipe for connection to the manifold of a ship, for example; a first counterweight mounted on the inner pipe on the opposite side of the inner axis from the inner pipe; an inner sheave rotatably mounted on a swivel joint between the inner pipe and the riser, said inner sheave being concentric with said inner axis; an outer sheave concentric with the outer axis and secured to the outer pipe in a common plane with the inner sheave; a cable extending around the sheaves for unitary rotation thereof; and a second counterweight mounted on the inner sheave. A loading apparatus of this type is counterbalanced about both the inner and outer axes by the counterweights, assuming proper size and adjustment thereof. However, particularly with loading apparatus using larger diameters of pipes, for example, ten inches and above, it is highly desirable to add power so that the apparatus can be easily manuevered about both the inner and outer axes as well as about an upstanding axis through the riser.

Accordingly, it is an object of the present invention to provide a fluid transferring apparatus including powered mechanisms for imparting movement to the apparatus.

Another object is to provide a fluid transferring apparatus which is fully counterbalanced and which includes powered mechanisms for imparting movement to the apparatus about various axes.

Another object is to mount and position powered mechanisms on a fluid transferring apparatus so that the apparatus is compact, so that the powered mechanisms do not interfere with each other, and so that the apparatus and mechanisms are dependable in operation.

These, together with other objects, will become apparent upon reference to the following description and accompanying drawings in which:

FIGURE 1 is a side elevation of a fluid transferring apparatus incorporating the powered mechanisms of the present invention.

FIGURE 2 is a fragmentary rear elevation of the apparatus shown in FIGURE 1.

FIGURE 3 is a fragmentary enlarged view, partially in section and partially in side elevation, of a portion of the apparatus shown in FIGURES 1 and 2.

The fluid transferring apparatus shown in FIGURES 1 and 2 includes a support generally indicated by the number 10 and upstanding from a base 12. The support includes an outer tubular riser 14 and an inner riser pipe 16 which is connected at its lower end to an elbow 17 that projects out of the riser. The riser and the pipe include a fixed coupling 18 relatively adjacent to their upper ends. A riser swivel joint 22 includes a male portion 23 connected to the upper ends of the riser and the pipe, and a female portion 24 rotatable on the male portion about a vertical axis and including a flange 26. A riser elbow 28 is secured to the flange and projects upward and laterally from the riser swivel joint.

An inner swivel joint 32 includes a male porion 33 rotatable about a substantially horizontal inner axis within a female portion 36 which has a flange 34 secured to the riser elbow 28. An inner pipe 38 includes an inner elbow 39 connected to the male portion 33 of the inner swivel joint and an outer elbow 40. An outer pipe 44 includes an inner elbow 45 connected to an outer swivel joint 46, the latter being connected to the outer elbow 40 of the inner pipe 38. The outer pipe also has an outer elbow 47 which is connected to a swivel coupling 48.

In order to counterbalance the inner and outer pipes 38 and 44 about the inner axis, an arm 52 is secured to the inner pipe and projects therefrom on the opposite side of the inner axis, and a main counterweight 54 is mounted on this arm, it being noted that this main counterweight includes a plurality of sections in order that the weight may be varied. A plate 56 projects outward from the riser 14, and a tie down assembly 57 includes portions on the plate and on the arm 52 for releasably latching the inner pipe in a rest position, as shown in FIGURES 1 and 2.

A main elevational control mechanism, one of the significant features of the present invention, includes a framework 60 mounted on the inner pipe 38. This framework provides a first longitudinal strut 61 extending lengthwise of the inner pipe and connected thereto by an outer reinforcing plate 62, an intermediate plate 63, a brace 64, and an inner reinforcing plate 65. Second and third longitudinal struts 68 extend lengthwise of the inner pipe, in ninety degree displaced relation to the first strut 61, and have opposite ends respectively connected to the intermediate plate and to the inner pipe adjacent to the arm 52. Triangular brackets 70 are secured to the second and third struts, and tie plates 71 interconnect these brackets and the longitudinal strut.

The main control mechanism also includes a sprocket 75 which is bolted to the female portion 36 of the inner swivel joint 32, in concentric relation with the inner axis. A pair of hydraulic cylinders 76 have their outer ends individually connected to said brackets 70 and their rods 77 connected to cylinder sprockets 78. A pipe sprocket 79, shown in dashed lines in FIGURE 1, is rotatably mounted on the first strut 61 in a common plane with said cylinder sprockets, and a chain 80 is trained around the sprocket 75, the cylinder sprockets 78, and the pipe sprocket 79. Thus, by extending and retracting the elevational control cylinders, torque is imposed on the inner pipe 38 about the inner axis thereby to raise the inner pipe, and thus the outer pipe 44. Downward movement of the inner pipe is achieved by controllably bleeding hydraulic fluid out of the cylinder on the right, as shown in FIGURE 1, in order to extend the rod of this cylinder, and at the same time contracting the rod of the left cylinder, it being understood that the inner pipe descends by force of gravity although being at all times controlled in its descent by the cylinders.

An auxiliary elevating control mechanism in accordance with the present invention includes an inner sheave 85 having a hub 86 rotatably mounted on the flange 34 of the inner swivel joint 32 by ball bearings 87, this inner sheave being concentric with said inner axis and in spaced parallel relation to the sprocket 75. An outer sheave 90 is secured to the outer pipe 44, in concentric relation with and rotatable about the outer axis. A cable 91 is trained around these sheaves and includes turnbuckles 92, the purpose of the cable being to effect unitary rotation of the sheaves.

A support frame 96 is mounted on the female portion 24 of the riser swivel joint 22 for rotation with this female portion about the upstanding axis of the riser 14. This frame includes a rib plate 98 secured to the riser elbow 28 and projecting outward therefrom, and a vertical mounting plate 99 secured to the rib plate in transverse relation thereto. A stub shaft 100 projects outward from the mounting plate coaxially of said inner axis. A vertical channel 102 is secured to the mounting plate by an upper block 104 and to the female portion 24 of the riser swivel joint 22 by a lower block 106. This channel extends downward alongside of the riser 14, and a horizontal angle piece 108 is secured to the lower end of the channel.

A sprocket 110 includes a hub 112 rotatably mounted on the stub shaft 100. Auxiliary control cylinders 114 have lower ends connected to the angle piece 108 and rods 115 individually connected to opposite ends of the chain 116 which is trained around the sprocket. Clevises 117 connect the auxiliary control cylinders to the channel above the angle piece.

An outer arm 120 has a lower end secured to the hub 112 of the sprocket 110 and projects radially from the inner axis. Similarly, an inner arm 122 has an end secured to the inner sheave 85 and projects therefrom in spaced parallel relation to the outer arm. A mounting rod 124 is radially adjustably supported between the arms 120 and 122, and an auxiliary counterweight 126, including a plurality of sections, is mounted on the rod 124.

Therefore, by extending and retracting the rods 115 of the auxiliary control cylinders 114, the sprocket 110 is rotated thereby to impart rotation to the inner sheave 85 and thus to the outer sheave 90 so that the outer pipe 44 is pivoted relative to the inner pipe. At the same time, the auxiliary counterweight 126 is pivoted along the inner axis so as to counterbalance the outer pipe about the outer axis.

A further significant feature of the present invention is a slewing mechanism, best illustrated in FIGURE 3, and including a depending grooved rim 130 secured to the female portion 24 of the riser swivel joint 22 and concentric with the upstanding axis of the riser 14. Brackets 132 project outward from the riser 14 immediately below the rim, and pulleys 133 are rotatably mounted on these brackets for rotation about an axis transversely disposed relative to the upstanding axis. Slewing cylinders 135 extend lengthwise of the riser, in generally common planes with the pulleys 133, and include rods 136 individually connected to a cable 137 which is trained around the rim and over the pulleys. The slewing cylinders are secured to the riser by brackets 139 and 140. Thus, by extending and retracting the rods 136, the rim, and thus the female portion of the riser swivel joint, is rotated thereby to rotate the support frame 96 and thus the inner and outer pipes 38 and 44 about the upstanding axis.

From the foregoing, it will be evident that the main, auxiliary, and slewing mechanisms provide for powered movement of the inner and outer pipes 38 and 44 about the upstanding axis, the inner pipe about the inner axis, and the outer pipe relative to the inner pipe. These mechanisms are incorporated in a double counterweighted apparatus so that, although the apparatus is powered, it remains in a state of counterbalance at all times. It is significant that the various control mechanisms of the present invention are so positioned that there is no interference of one with the other and that the general arrangement is highly compact and dependable in operation.

Although a preferred embodiment of the present invention has been shown and described, it will be understood that various changes and modifications may be made in the details thereof without departing from the spirit and the scope of the appended claims.

Having thus described the invention, what is claimed as new and desired to be secured by Letters Patent is as follows:

1. In a fluid transferring apparatus, a support, an inner pipe mounted on the support for elevational pivotal movement about an inner axis, an outer pipe pivotally connected to the inner pipe for movement relative thereto about an outer axis substantially parallel to said inner axis, means for counterbalancing the inner and outer pipes about said inner axis, means for counterbalancing the outer pipe about said outer axis, and means for imparting elevational movement to the inner pipe about the inner axis, said elevational movement means including a sprocket rigid with said support and projecting radially outward from said inner axis, and a fluid actuated cylinder system mounted on said inner pipe and connected via a chain to said sprocket for applying a torque to said inner pipe about said inner axis.

2. In a fluid transferring apparatus, a support, an inner pipe mounted on said support for elevational pivotal movement about an inner axis, an outer pipe pivotally connected to the inner pipe for pivotal movement relative to the inner pipe about an outer axis substantially parallel to said inner axis, an inner rotary member mounted on said support for movement about an axis substantially parallel to said outer axis, an outer rotary member secured to said outer pipe and movable therewith about said outer axis, means interconnecting said rotary members for unitary movement of the latter, a third rotary member mounted on said support for movement about said axis of the inner member and spaced therealong relative to said inner rotary member, a counterweight, means supporting said counterweight and interconnecting said inner rotary member and said third rotary member for counterbalancing said outer pipe about said outer axis, means mounted on said support for imparting rotary movement to said third rotary member and thus to said outer pipe, and means for counterbalancing said inner and outer pipes about said inner axis.

3. The apparatus of claim 2 wherein said counterweight supporting means includes arms individually connected to said inner and third rotary members projecting radially therefrom and a rod interconnecting said arms to which said counterweight is attached.

4. The apparatus of claim 2 including an elevating member secured to said support and projecting radially from said inner axis adjacent to said inner rotary member, and means mounted on said inner pipe and connected to said elevating member for applying a torque to said inner pipe about said inner axis thereby to control the elevational movement of the inner pipe about said inner axis.

5. The apparatus of claim 2 wherein the axis of said inner and third rotary members is coaxial with said inner axis.

6. In a fluid transferring apparatus, a support including a relatively stationary portion and a frame mounted for rotation on said stationary portion about an upstanding axis, an inner pipe mounted on said frame for elevational pivotal movement about an inner axis, an outer pipe pivotally connected to the inner pipe for movement relative to said inner pipe about an outer axis substantially parallel to said inner axis, an inner gear fixed to said frame in concentric relation with said inner axis, an inner sheave concentric with and rotatable about said inner axis in spaced parallel relation to said gear, a sprocket mounted on said frame in concentric relation with said inner axis and rotatable thereabout, said sprocket being positioned on the opposite side of said sheave from said gear, a rim secured to said frame in concentric relation with said upstanding axis, main powered mechanism mounted on said inner pipe and connected to said gear for raising and lowering said inner pipe about said inner axis, an outer sheave secured to said outer pipe concentrically of said outer axis and in a common plane with said inner sheave, a cable trained around said sheaves for unitary rotation thereof, an inner arm rigid with said inner sheave and projecting radially therefrom, an outer arm rigid with said sprocket and projecting in substantially parallel relation with said inner arm, a rod interconnecting said arms, an auxiliary counterweight mounted on said rod, a main counterweight mounted on said inner pipe on the opposite side of said inner axis from said inner pipe, auxiliary powered mechanism mounted on said frame and connected to said sprocket for imparting rotation thereto and thus to said outer pipe through said arms, sheaves and cable, and powered slewing mechanism mounted on the stationary portion of said support and connected to said rim for imparting movement to said frame about said upstanding axis.

7. The apparatus of claim 6 wherein each of said powered mechanisms includes a fluid actuated cylinder and its associated piston rod.

8. In a fluid transferring apparatus, a support, an inner pipe mounted on the support for elevational pivotal movement about an inner axis, an outer pipe pivotally connected to the inner pipe for movement relative thereto about an outer axis substantially parallel to said inner axis, means for counterbalancing the inner and outer pipes about said inner axis, means for counterbalancing the outer pipe about said outer axis, a gear secured to said support and concentric with said inner axis, a pair of fluid actuated cylinders and rods mounted on and extending lengthwise of said inner pipe, first and second sprockets respectively connected to said rods, a third sprocket mounted on said inner pipe in triangular relationship with said first and second sprockets, and a chain trained around said sprockets and said gear so that upon extension and retraction of said rods torque is applied to said inner pipe about said inner axis thereby elevationally to adjust the position of said inner pipe.

References Cited
UNITED STATES PATENTS 3,236,259 2/1966 Ashton _____ 137—615
3,073,343 1/1963 Mowell _____ 141—387 XR
3,114,392 12/1963 Harper _____ 137—615

ALAN COHAN, *Primary Examiner.*

HOWARD M. COHN, *Assistant Examiner.*

U.S. Cl. X.R.

212—48; 141—387